F. A. THURSTON.
CLUTCH MECHANISM.
APPLICATION FILED JULY 19, 1910.

1,004,940.

Patented Oct. 3, 1911.
2 SHEETS—SHEET 2.

Witnesses:
Sydney E. Taft
Leonard A. Powell

Inventor:
Fredick A. Thurston,
By his attorney, Charles S. Gooding.

UNITED STATES PATENT OFFICE.

FREDRICK A. THURSTON, OF LYNN, MASSACHUSETTS, ASSIGNOR OF FORTY-EIGHT ONE-HUNDREDTHS TO HENRY MAYBERRY JONES, OF LYNN, MASSACHUSETTS.

CLUTCH MECHANISM.

1,004,940.      Specification of Letters Patent.      Patented Oct. 3, 1911.

Application filed July 19, 1910. Serial No. 572,691.

*To all whom it may concern:*

Be it known that I, FREDRICK A. THURSTON, a citizen of the United States, residing at Lynn, in the county of Essex and State of Massachusetts, have invented new and useful Improvements in Clutch Mechanism, of which the following is a specification.

This invention relates to an improved clutch mechanism which is particularly adapted to be used in a mechanism where it is desired to drive the shaft by means of a friction clutch, and also where it is desired to impart alternately opposite directions of rotation to said shaft.

The object of the invention is to provide a clutch of the character set forth which is simple in its construction and which is very powerful on account of the large gripping surface embodied therein and the manner in which the driven member of the shaft operates to force the friction shoes both radially and longitudinally relatively to the driving shaft against the driven member of the clutch.

The invention consists in the combination and arrangement of parts set forth in the following specification and particularly pointed out in the claims thereof.

Figure 1:
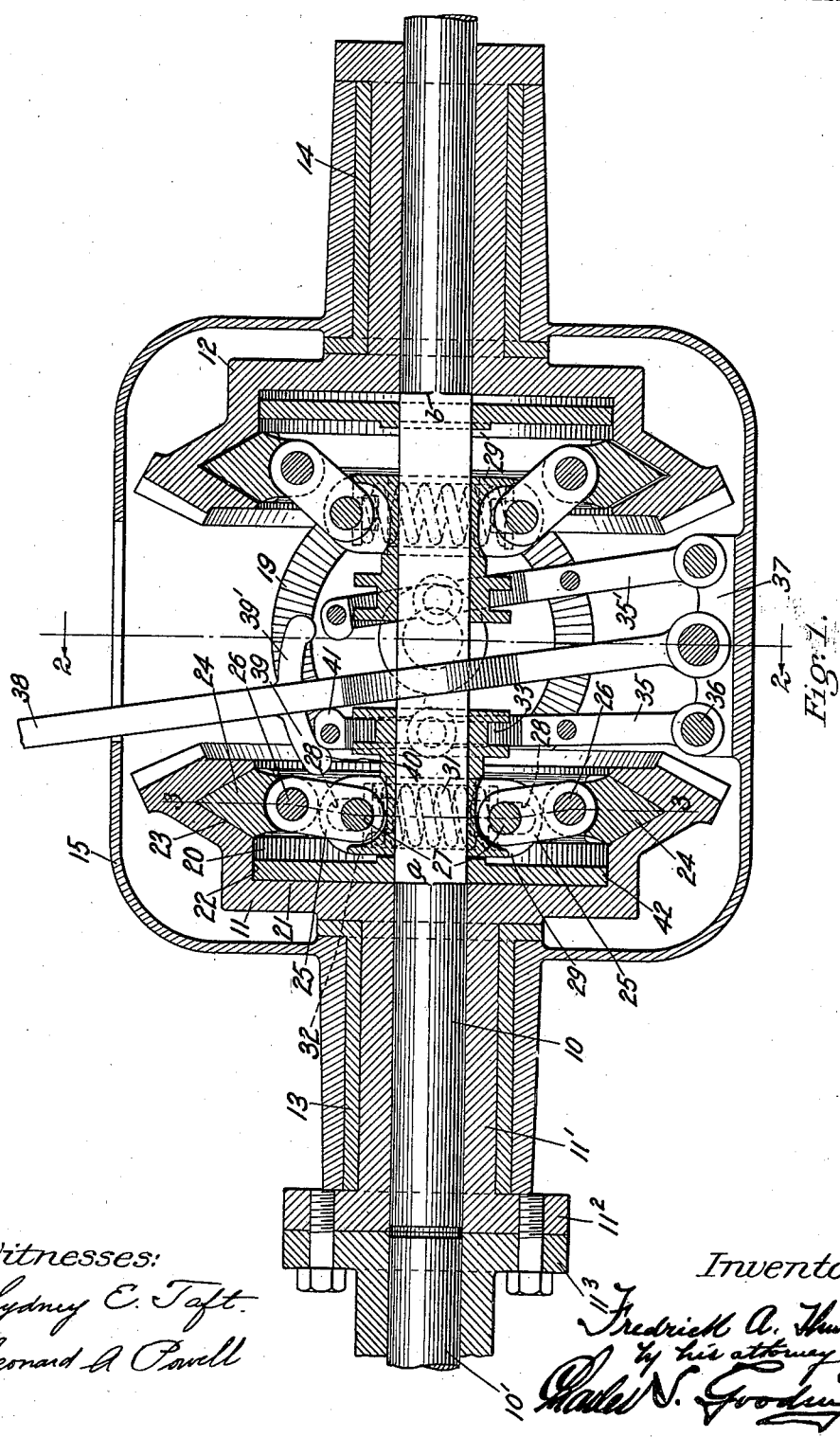
Figure 2:
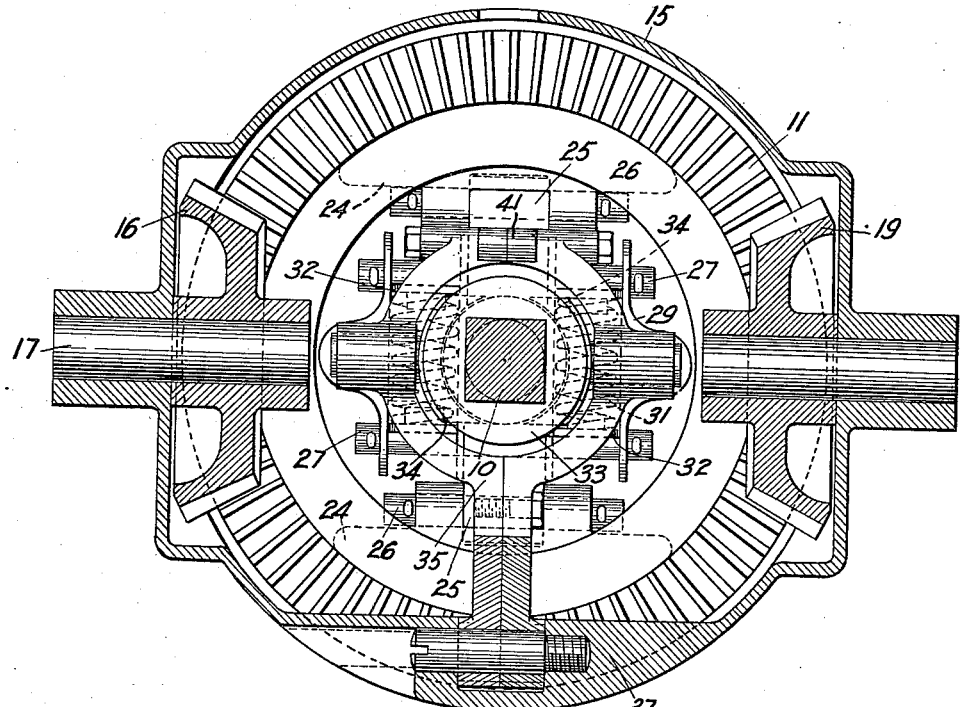
Figure 4:
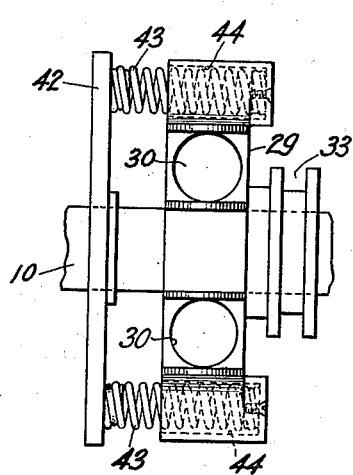
Figure 3:
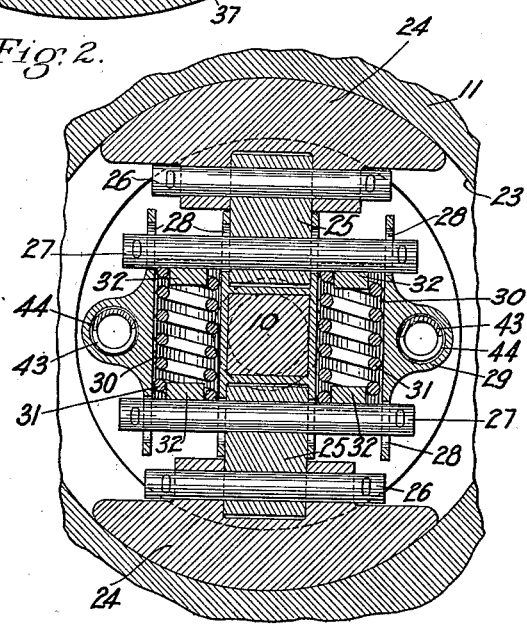

Referring to the drawings: Figure 1 is a longitudinal sectional elevation of my improved clutch mechanism. Fig. 2 is a sectional elevation taken on line 2—2 of Fig. 1, with lever broken off. Fig. 3 is a sectional elevation taken on line 3—3 of Fig. 1. Fig. 4 is a detail plan of one of the driving members.

Like numerals refer to like parts throughout the several views of the drawings.

In the drawings, 10 is the main driven shaft, said shaft being preferably square in cross section from the line $a$ to the line $b$ and circular in cross section throughout the rest of its length.

Two bevel gears 11 and 12 constitute driving members of the clutch mechanism and are practically duplicates of each other oppositely arranged and adapted to rotate upon the cylindrical portion of the shaft 10 and within the bearings 13, 14, respectively, of the casing 15. The bevel gears 11 and 12 mesh into a bevel pinion 16 which is journaled to rotate upon a stud 17 clamped to the frame or casing 15, so that when the gear 11 is rotated in one direction the gear 12 will be rotated in the opposite direction. An idler bevel pinion 19 also meshes into the gear 11 and 12 on the opposite side of the shaft 10 from that upon which the bevel pinion 16 is located. The hub 11' of the gear 11 has a flange $11^2$ fast to a coupling $11^3$ which is fast to a main driving shaft 10' rotated in any suitable manner.

The gear 11 is provided with a cylindrical chamber 20 having a side wall 21 and a peripheral wall 22, said peripheral wall being provided with a V-shaped annular groove 23 and in this annular groove are located two friction shoes 24, 24 which are adapted to fit into the groove 23 and extend partly therearound, as will be seen by reference to Figs. 1 and 2. These friction shoes 24, 24 each have pivoted thereto a link 25 by means of a pin 26 and these links each have fastened thereto a pin 27 which projects through slots 28, 28 provided in the driven member or carrier 29 of the clutch. This driven member 29 is illustrated in detail plan in Fig. 4 and is provided with two holes 30, 30 to receive helical springs 31, 31 which at their opposite ends bear against sliding collars 32, 32 which, in turn, bear against the pivotal pins 27, 27.

The driven member 29 is adapted to slide upon the driven shaft 10, but is prevented from rotating thereon by reason of the fact that the shaft 10, at the portion thereof which extends through said driven member, is square and the hole in the driven member is square to fit the square portion of said shaft. Said driven member 29 has an annular groove 33 therein in which are located two spanner yokes 34, 34, and these spanner yokes are pivotally mounted in a lever 35 pivoted at 36 to a bracket 37. The lever 35 is rocked upon its pivot to move the member 29 longitudinally of the shaft 10 by a hand lever 38 which has an arm 39 thereon provided with an enlarged portion 40. The lever 35 also has an enlarged portion 41 which bears against the left hand side of the lever 38 when the parts are in the position illustrated in Fig. 1 and when the handle is thrown toward the right, as hereinafter more fully described, the enlarged portion 40 upon the arm 39 clears the upper end of the lever 35 when the sliding member 29 has been moved far enough to the right to disengage the friction shoes 24, 24 from the gear 11. Another friction shoe 42 is provided within the chamber 20, the same consisting of a disk which is free to slide longitudinally of the shaft 10, but is prevented from turning thereon by reason of fitting the square portion of said shaft. Said disk 42 is connected to the driven member 29 by helical springs 43, 43 located in pockets 44, 44 provided in said driven member.

The gear 12 is constructed the same as the gear 11 and is locked to the shaft by a mechanism substantially like that hereinbefore described for locking the gear 11 to the shaft 10, and this mechanism has a driven member 29′ which is actuated by the lever 35′ operated by the lever 38 and an arm 39′, thereon, which arm 39′ operates to rock the lever 35′ in the same manner as hereinbefore described in relation to the arm 39 and lever 35.

The general operation of the mechanism hereinbefore specifically described is as follows: Assuming the lever 38 to be in a vertical or central position, then the friction shoes will be out of contact with the gears 11 and 12 and said gears will be rotated in opposite directions upon the shaft 10, but without rotating the same. If it is desired to rotate the shaft 10 in one direction, the lever 38 is moved from its central position toward the left and engages at its left hand side the enlarged portion 41 of the lever 35, thus tipping said lever 35 toward the left which, by means of the spanner yokes 34, 34, pushes the driven member 29 toward the left (Fig. 1) along the square portion of the shaft 10, and as the sliding member 29 is so moved the toggle links 25, 25 are brought to the position illustrated in Fig. 1—that is, with the pivotal pins 27, 27 slightly to the left of a vertical plane passing through the centers of the pivotal pins 26, 26 and at right angles to and transversely of the shaft 10. Thus the friction shoes 24, 24 will be moved outwardly radially from the shaft 10 and into contact with the friction bearing surfaces of the annular groove 23, and these friction shoes 24, 24 will be locked against withdrawal from contact with the friction bearing surfaces of the groove 23 by reason of the toggle links being slightly inclined toward a vertical plane, as hereinbefore described.

Simultaneously with the movement of the toggle links 24, 24 into contact with the friction bearing surfaces formed by the annular groove 23 in the gear 11, the disk-shaped friction shoe 42 will also be moved toward the left until it contacts with the friction bearing surface formed by the side wall of the chamber 20 within the gear 11, and this friction disk will be moved by means of the springs 43, 43 which connect the driven member 29 with said friction shoe. It will now be seen that the gear 11 will be locked by the friction shoes and the driven member 29 to the shaft 10 and will, therefore, rotate said shaft in one direction when said gear 11 is rotated as hereinbefore set forth.

When the lever 38 is moved back to its central position, the enlarged portion 40 upon the arm 39 will reverse the movement of the clutch member parts hereinbefore described, viz, the sliding member 29, the toggle links and the friction shoes and will thus release the shaft 10 from the gear 11. By reason of the different locations of the pivots of the lever 38 and the lever 35; when said lever has been brought to its central or vertical position, the enlarged portion 40 will pass over the top of the lever 35 and become disengaged therefrom. Then, upon further movement toward the right, the sliding member 29′ will be moved toward the right by the lever 38 engaging the lever 35′ and the toggle links and friction shoes of the right hand clutch member will be thrown into frictional engagement with the gear 12 in a similar manner to that hereinbefore described with relation to the friction shoes of the gear 11. The gear 12 will thus become locked to the shaft 10, and as the gear 12 rotates in the opposite direction from that of the gear 11, it is evident that the direction of rotation of the shaft 10 will be reversed from the direction in which it rotated when the gear 11 was locked thereto, as hereinbefore described.

Having thus described my invention, what I claim and desire by Letters Patent to secure is:

1. A clutch mechanism having, in combination, a shaft, a driving member rotatably mounted on said shaft and having a plurality of friction bearing surfaces thereon, a driven member slidable longitudinally of said shaft and locked against rotation relatively thereto, a friction shoe movable longitudinally of said shaft, a friction shoe movable radially of said shaft, independent connections between said longitudinally and radially movable shoes and said driven member, respectively, whereby said driven member is adapted, when moved longitudinally of said shaft, to move said shoes longitudinally and radially of said shaft, respectively, and into contact with the bearing surfaces on said driving member.

2. A clutch mechanism having, in combination, a shaft, a driving member rotatably mounted on said shaft and having a plurality of friction bearing surfaces thereon, a driven member slidable longitudinally of said shaft and locked against rotation relatively thereto, a friction shoe movable longitudinally of said shaft, a friction shoe movable radially of said shaft, and independent yielding means interposed between said driven member and said longitudinally and radially movable friction shoes respectively, whereby when said driven member is moved longitudinally of said shaft, said shoes may be moved longitudinally and radially of said shaft, respectively, and forced against the friction bearing surfaces on said driving member with a yielding pressure.

3. A clutch mechanism having, in combination, a shaft, a gear rotatably mounted on said shaft, said gear having a plurality of friction bearing surfaces thereon, a carrier slidable longitudinally of said shaft and locked against rotation thereon, and a plurality of friction shoes adapted to be forced by said carrier longitudinally and radially relatively to said shaft against said friction bearing surfaces, and means to lock said shoes against rotation relatively to said carrier.

4. A clutch mechanism having, in combination, a shaft, a gear rotatably mounted on said shaft, said gear having a plurality of friction bearing surfaces thereon, a carrier slidable longitudinally of said shaft and locked against rotation thereon, a plurality of friction shoes adapted to be moved by said carrier longitudinally and radially relatively to said shaft, and independent yielding means interposed between said carrier and friction shoes respectively, whereby said shoes may be forced against said friction bearing surfaces with a yielding pressure.

5. A clutch mechanism having, in combination, a shaft, a driving member rotatable on said shaft, a driven member movable longitudinally of said shaft and locked against rotation thereon, a friction shoe located in an annular groove provided in said driving member, and a connection from said shoe to said driven member, and a spring interposed between said driven member and connection, whereby when said driven member is moved longitudinally of said shaft, said shoe may be forced into said annular groove and against said driving member with a yielding pressure.

6. A clutch mechanism having, in combination, a shaft, a gear rotatable on said shaft and having a chamber therein, a driven member movable longitudinally of said shaft and locked against rotation thereon, a friction shoe adapted to bear against the peripheral wall of said chamber, a friction shoe adapted to bear against the side wall of said chamber, and connections between said driven member and said shoes, whereby when said driven member is moved longitudinally of said shaft, said shoes will be forced against the peripheral and side walls of said chamber, respectively, said connections locking said driven member and said shoes against relative rotation.

7. A clutch mechanism having, in combination, a shaft, a driving member rotatable on said shaft, a driven member movable longitudinally of said shaft and locked against rotation thereon, a friction shoe located in an annular groove provided in said driving member, a link pivoted at one end to said shoe and at the other end pivoted to and slidable upon said driven member, a spring interposed between said link and driven member, and means to move said driven member longitudinally of said shaft, whereby said shoe may be forced into said annular groove and against said driving member with a yielding pressure.

8. A clutch mechanism having, in combination, a shaft, a driving member rotatable on said shaft, a driven member movable longitudinally of said shaft and locked against rotation thereon, friction shoes located on opposite sides of said shaft adapted to be moved radially relatively to said shaft, and links each pivotally connected at one end to one of said shoes and at the opposite end pivotally and slidably connected to said driven member, and a spring interposed between the adjacent ends of said links, whereby said shoes may be forced against said driving member with a yielding pressure.

In testimony whereof I have hereunto set my hand in presence of two subscribing witnesses.

FREDRICK A. THURSTON.

Witnesses:
   Louis A. Jones,
   Sydney E. Taft.